United States Patent
Matsuoka (10) Patent No.: US 11,770,608 B2
(45) Date of Patent: Sep. 26, 2023

(54) IMAGING APPARATUS, METHOD FOR CONTROLLING THE SAME, AND STORAGE MEDIUM

(71) Applicant: CANON KABUSHIKI KAISHA, Tokyo (JP)

(72) Inventor: Keisuke Matsuoka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/733,558

(22) Filed: Apr. 29, 2022

(65) Prior Publication Data
US 2022/0368837 A1 Nov. 17, 2022

(30) Foreign Application Priority Data
May 13, 2021 (JP) ................................ 2021-081560

(51) Int. Cl.
*H04N 23/661* (2023.01)
*H04N 23/61* (2023.01)
*H04N 23/695* (2023.01)

(52) U.S. Cl.
CPC .......... *H04N 23/662* (2023.01); *H04N 23/61* (2023.01); *H04N 23/695* (2023.01)

(58) Field of Classification Search
CPC ......... H04N 5/232061; H04N 5/23299; H04N 5/23218
See application file for complete search history.

(56) References Cited

U.S. PATENT DOCUMENTS

| | | | | |
|---|---|---|---|---|
| 8,854,594 B2 * | 10/2014 | Densham | ............... | G01S 3/7864 348/169 |
| 10,021,255 B2 * | 7/2018 | Funakawa | .......... | H04N 1/00015 |
| 11,412,157 B1 * | 8/2022 | Slavin | ..................... | G06V 20/52 |
| 11,431,943 B2 * | 8/2022 | Ansley | ................... | G01S 5/0027 |
| 2011/0149072 A1 * | 6/2011 | McCormack | .......... | H04N 7/181 348/143 |
| 2012/0050535 A1 * | 3/2012 | Densham | ............... | H04N 7/181 348/E7.085 |
| 2012/0268608 A1 * | 10/2012 | Watanabe | ............ | H04N 23/695 348/169 |
| 2013/0059542 A1 * | 3/2013 | Shimizu | ................ | H04W 4/021 455/67.11 |
| 2015/0241546 A1 * | 8/2015 | Boyle | ................. | G06F 18/2413 342/359 |

(Continued)

FOREIGN PATENT DOCUMENTS

JP 4189534 B2 12/2008

*Primary Examiner* — Pritham D Prabhakher
(74) *Attorney, Agent, or Firm* — Canon U.S.A., Inc., IP Division (57) ABSTRACT

An imaging apparatus configured to change an imaging direction and to perform wireless communication includes at least one memory storing instructions, and at least one processor that is configured, upon execution of the stored instructions, to act as a position identification unit configured to identify a position of a subject based on an incoming direction of a radio wave received from a wireless apparatus held by the subject, and a control unit configured to, based on the identified position of the subject, perform control to change the imaging direction based on the subject not being in a predetermined region of a captured image, and not to change the imaging direction based on the subject being in the predetermined region.

12 Claims, 9 Drawing Sheets

(56) References Cited

U.S. PATENT DOCUMENTS

| | | | | |
|---|---|---|---|---|
| 2016/0080638 A1* | 3/2016 | Kotzur | ................ | G01C 15/002 |
| | | | | 348/135 |
| 2016/0134838 A1* | 5/2016 | Tangeland | ............ | H04N 7/152 |
| | | | | 348/14.09 |
| 2016/0360049 A1* | 12/2016 | Funakawa | ............... | H04W 4/80 |
| 2017/0155827 A1* | 6/2017 | Kim | ....................... | H04N 23/69 |
| 2017/0163899 A1* | 6/2017 | Irie | ..................... | H04N 23/632 |
| 2017/0236298 A1* | 8/2017 | Vetter | .................... | G06V 40/10 |
| | | | | 348/77 |
| 2017/0278262 A1* | 9/2017 | Kawamoto | .............. | H04N 5/64 |
| 2018/0211507 A1* | 7/2018 | Ihara | ..................... | G08B 21/18 |
| 2019/0373115 A1* | 12/2019 | Torikai | ................ | H04N 23/633 |
| 2020/0226331 A1* | 7/2020 | Khojastepour | .... | G06K 7/10356 |
| 2020/0302664 A1* | 9/2020 | Lee | ....................... | G06T 11/001 |
| 2021/0120159 A1* | 4/2021 | Yang | ...................... | G06T 7/248 |
| 2021/0227132 A1* | 7/2021 | Cai | ..................... | H04N 23/698 |
| 2021/0286980 A1* | 9/2021 | Stawiszynski | ......... | H04N 23/53 |
| 2021/0360161 A1* | 11/2021 | Reed | .................... | A63B 71/08 |
| 2021/0368105 A1* | 11/2021 | Vankipuram | .......... | G06N 20/00 |
| 2022/0060662 A1* | 2/2022 | Ansley | ................ | H04W 4/021 |

* cited by examiner

IMAGING APPARATUS, METHOD FOR CONTROLLING THE SAME, AND STORAGE MEDIUM

BACKGROUND

Field

The present disclosure relates to an imaging apparatus, a method for controlling the imaging apparatus, and a storage medium.

Description of the Related Art

There are known network cameras that perform pan, tilt, and zoom control (hereinafter referred to as PTZ control). Some of these kinds of network cameras have an automatic tracking function of changing an imaging direction based on the position of a subject to keep capturing the subject within a screen.

Japanese Patent No. 4189534 discusses a technique in which the imaging direction of a camera is controlled not to be changed when the position of the subject to be tracked is determined to be in a range of a dead zone, and to be changed in a direction for tracking the subject when the position of the subject to be tracked is determined to be outside the range of the dead zone. This technique prevents the imaging direction of the camera from changing in response to a slight movement of the subject within the screen, thereby enabling the subject to be automatically tracked with an easy-to-view video image.

Normally, a video analysis is used to identify the position of a person as the subject. However, the use of the video analysis can cause a failure to accurately identify the position of the person, depending on an imaging environment, such as a color change due to an illumination change, and the state of the object appearing in a video image, such as the orientation or posture of the person. The technique discussed in Japanese Patent No. 4189534 enables identification of the position of the subject based on a differential image between frames, but can similarly cause a failure to accurately identify the position of the subject depending on the imaging environment and the state of the object appearing in the video image.

SUMMARY

According to an aspect of the present disclosure, an imaging apparatus configured to change an imaging direction and to perform wireless communication includes at least one memory storing instructions, and at least one processor that is configured, upon execution of the stored instructions, to act as a position identification unit configured to identify a position of a subject based on an incoming direction of a radio wave received from a wireless apparatus held by the subject, and a control unit configured to, based on the identified position of the subject, perform control to change the imaging direction based on the subject not being in a predetermined region of a captured image, and not to change the imaging direction based on the subject being in the predetermined region.

Further features of the present disclosure will become apparent from the following description of exemplary embodiments with reference to the attached drawings.

DESCRIPTION OF THE EMBODIMENTS

Exemplary embodiments of the present disclosure will be described below with reference to the attached drawings.

Figure 1:
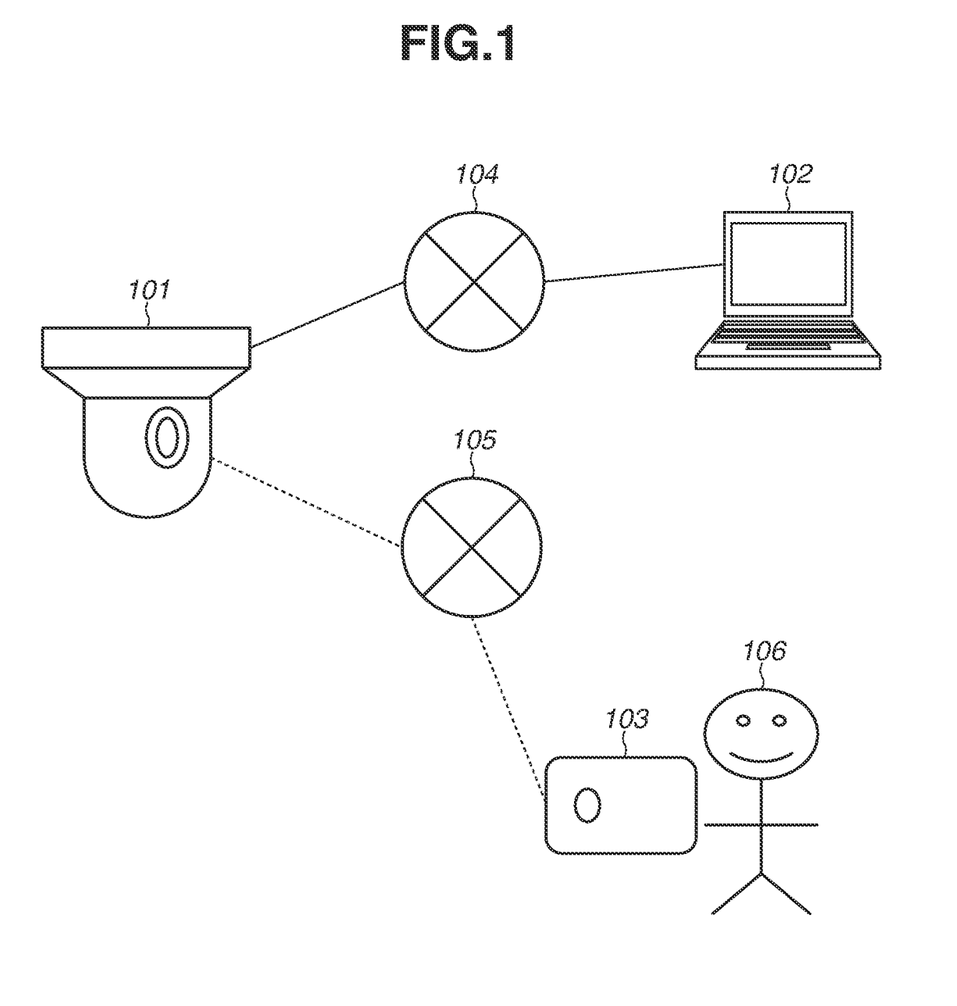
FIG. 1 is a diagram illustrating a configuration of a network system according to a first exemplary embodiment.

FIG. 1 illustrates a configuration of a network system according to a first exemplary embodiment.

The network system according to the present exemplary embodiment includes a network camera 101, a client apparatus 102, a wireless apparatus 103, a network 104, and a wireless network 105.

The network camera 101 can distribute a video image and be controlled via a wired or wireless network. In the present exemplary embodiment, the network camera 101 functions as an imaging apparatus to which the present exemplary embodiment is applied.

The client apparatus 102 is connected to the network camera 101 via the network 104. The client apparatus 102 controls the network camera 101, and outputs information about the network camera 101 via a browser.

The wireless apparatus 103 is connected to the network camera 101 via the wireless network 105. The wireless apparatus 103 includes a built-in wireless communication module in compliance with Bluetooth® 5.1 specifications. The wireless apparatus 103 is assumed to be held by a subject 106 to be imaged by the network camera 101 (the wireless apparatus 103 is carried by the subject 106 if the subject 106 is a person), and is used to automatically track the subject 106 using the network camera 101, as will be described in detail below.

The network 104 is used to distribute a video image captured by the network camera 101 to an external recording server or the like, and enables the network camera 101 and the client apparatus 102 to communicate with each other. The communication system of the network 104 is assumed to be a wired local area network (LAN) in the present exemplary embodiment, but may be a wireless LAN.

The wireless network 105 enables the network camera 101 and the wireless apparatus 103 to communicate with each other. The wireless network 105 is assumed to comply with Bluetooth® in the present exemplary embodiment, but may comply with a wireless communication standard such as Z-Wave®, ZigBee®, or the like.

Figure 2:
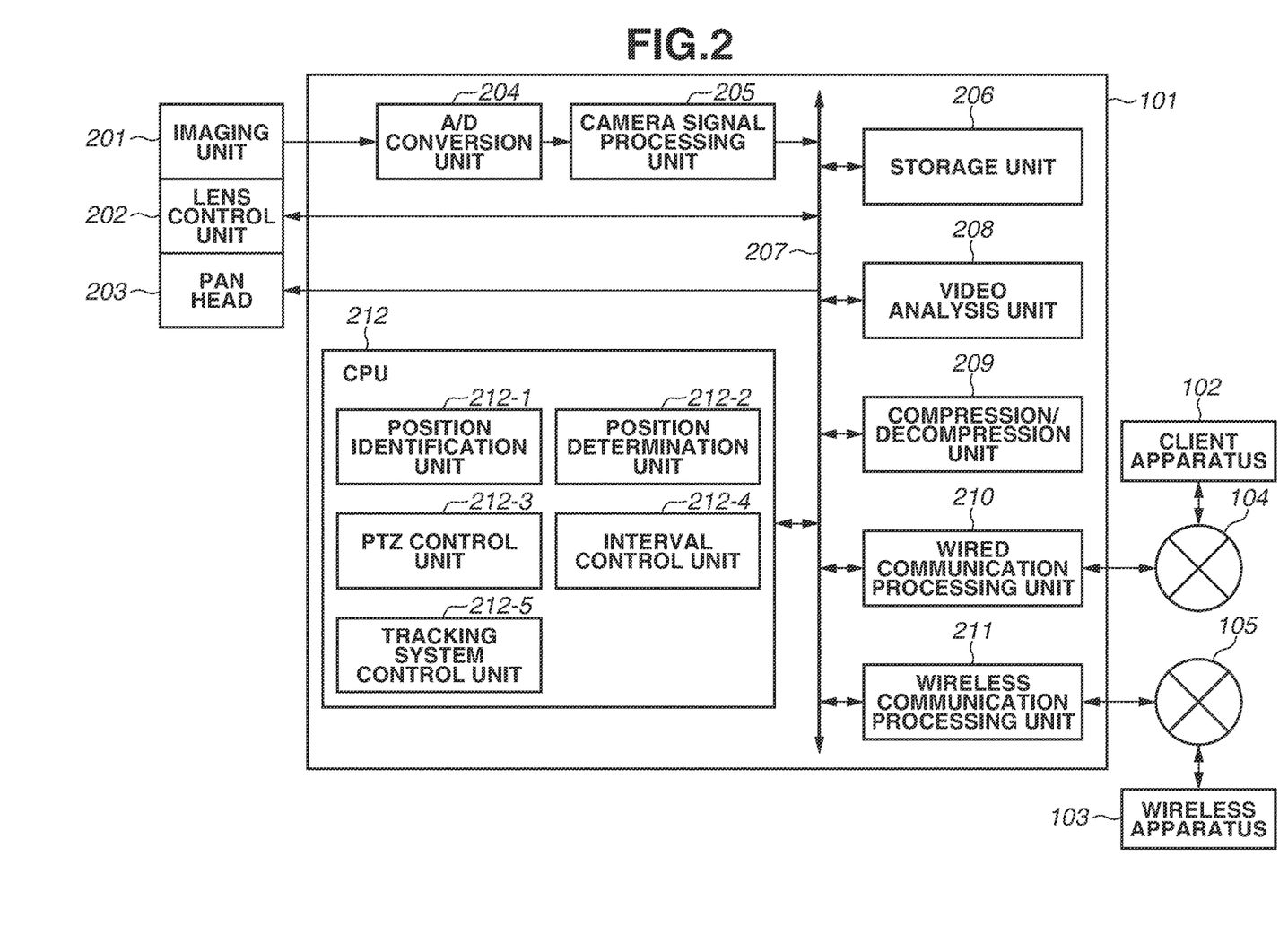
FIG. 2 is a diagram illustrating an example of a configuration of a network camera according to the first exemplary embodiment.

FIG. 2 illustrates an example of a configuration of the network camera 101 according to the present exemplary embodiment.

The network camera 101 includes an imaging unit 201, a lens control unit 202, and a pan head 203. The network camera 101 further includes an analog-to-digital (A/D) conversion unit 204, a camera signal processing unit 205, a storage unit 206, a bus 207, a video analysis unit 208, a compression/decompression unit 209, a wired communication processing unit 210, a wireless communication processing unit 211, and a central processing unit (CPU) 212.

The imaging unit 201 includes a zoom lens, a focus lens, a diaphragm, and an image sensor.

The lens control unit 202 controls the zoom lens and the focus lens to move along an optical axis and controls the diaphragm to operate. In the imaging unit 201, the image sensor photoelectrically converts light having passed through the zoom lens, the focus lens, and the diaphragm to generate an analog image signal. The analog image signal generated by the image sensor is output to the A/D conversion unit 204 after being subjected to amplification processing using sampling.

The pan head 203 includes a pan driving unit and a tilt driving unit. The pan head 203 is controlled via a not-illustrated actuator to perform pan and tilt driving (hereinafter referred to as PT driving) for rotating the imaging unit 201 in horizontal and vertical directions, so that the imaging direction can be changed.

The A/D conversion unit 204 converts the analog image signal into a digital image signal and outputs the digital image signal to the camera signal processing unit 205.

The camera signal processing unit 205 generates a video signal by performing various kinds of image processing on the digital image signal output from the A/D conversion unit 204. Examples of the various kinds of image processing include offset processing, gamma correction processing, gain processing, Red Green Blue (RGB) interpolation processing, noise reduction processing, and color tone correction processing.

The storage unit 206 includes a not-illustrated random access memory (RAM), read only memory (ROM), storage device, and/or the like. The RAM is a volatile memory such as a static RAM (SRAM) or a dynamic RAM (DRAM). The ROM is a nonvolatile memory such as an electrically erasable programmable read only memory (EEPROM) or a flash memory. The storage device is a hard disk drive (HDD), a solid-state drive (SSD), or the like. A program for implementing functions to be described in the present exemplary embodiment, and data used to execute the program are stored in the ROM or the storage device. The program and the data are loaded into the RAM via the bus 207 under control of the CPU 212 as appropriate, and are executed by the CPU 212. This enables implementation of the functions of a position identification unit 212-1, a position determination unit 212-2, a pan, tilt, and zoom (PTZ) control unit 212-3, an interval control unit 212-4, and a tracking system control unit 212-5.

The video analysis unit 208 analyzes the video signal to perform various kinds of detection processing such as human body detection, face detection, and moving object detection. One example of the video analysis for identifying the position of the subject 106 is the human body detection that detects a human body in an image frame, but the video analysis unit 208 may be configured to use the face detection or the moving object detection depending on a use scene. The CPU 212 is notified of a result of the video analysis by the video analysis unit 208 via the bus 207.

The compression/decompression unit 209 generates compressed data by performing compression/decompression processing on the video signal.

The wired communication processing unit 210 performs processing for network communication between the network camera 101 and the client apparatus 102 via the network 104.

The wireless communication processing unit 211 performs processing for wireless communication between the network camera 101 and the wireless apparatus 103 via the wireless network 105. The wireless communication processing unit 211 is assumed to be included in a wireless communication module in compliance with the Bluetooth® 5.1 specifications in the present exemplary embodiment, but is not limited thereto. For example, the network camera 101 may be configured in such a manner that a wireless communication module is externally connected to the network camera 101 using a general-purpose interface such as Universal Serial Bus (USB).

The CPU 212 is in charge of overall control of the network camera 101. In addition, the CPU 212 functions as the position identification unit 212-1, the position determination unit 212-2, the PTZ control unit 212-3, the interval control unit 212-4, and the tracking system control unit 212-5.

The position identification unit 212-1 identifies the relative position of the wireless apparatus 103, i.e., the relative position of the subject 106 holding the wireless apparatus 103 as viewed from the network camera 101 based on an incoming direction of a radio wave received from the wireless apparatus 103 (hereinafter referred to as a radio wave direction). Assume that the method for identifying the position of the subject 106 by the position identification unit 212-1 is performed based on the direction finding function in wireless communication conforming to the Bluetooth® 5.1 specifications, and the details thereof will be described below with reference to FIG. 3.

The position determination unit 212-2 determines whether the subject 106 is in a predetermined region of the captured image, based on the position of the subject 106 identified by the position identification unit 212-1. Hereinafter, the predetermined region will be referred to as the dead zone. FIGS. 5A to 5F schematically illustrate examples of the image frame of the captured image in automatic tracking processing. A dead zone 501 is a rectangular region set based on a predetermined width and a predetermined height in the image frame, and is a region not including an outer edge of the image frame (a region apart from the outer edge). In the present examples, the dead zone 501 is a central region of the image frame. In a case where the subject 106 is captured within the dead zone 501, the PT driving for automatically tracking the subject 106 is disabled.

The PTZ control unit 212-3 performs the PTZ control using the lens control unit 202 and the pan head 203, based on the position of the subject 106 identified by the position identification unit 212-1 and the result of the determination made by the position determination unit 212-2. The PTZ control unit 212-3 controls the PT driving to change the imaging direction toward the position of the subject 106, thereby enabling automatic tracking of the subject 106. In the present exemplary embodiment, a description will be given assuming that the automatic tracking is performed by the control of the PT driving. The PTZ control unit 212-3 switches the setting of the PT driving between an enabled state and a disabled state based on whether the subject 106 is in the dead zone 501. The PTZ control unit 212-3 controls the PT driving to be performed in conjunction with the position of the subject 106 while the PT driving is in the enabled state, and not to be performed while the PT driving is in the disabled state even when the position of the subject 106 is changed.

The interval control unit 212-4 controls a transmission interval for transmitting the radio wave from the wireless apparatus 103 to the network camera 101. The interval control unit 212-4 transmits instruction data indicating the transmission interval to the wireless apparatus 103, so that the wireless apparatus 103 changes the transmission interval for transmitting the radio wave to the network camera 101. Reducing the transmission interval enables the network camera 101 to keep track of the position of the subject 106, but leads to heavy battery consumption in the wireless apparatus 103. On the other hand, increasing the transmission interval can reduce the battery consumption in the wireless apparatus 103, but increases an interval at which the network camera 101 identifies the position of the subject 106, which makes it difficult to identify the position of the subject 106.

The tracking system control unit 212-5 controls the overall processing for the automatic tracking and, for example, performs initial setting for the automatic tracking processing.

Figure 3:
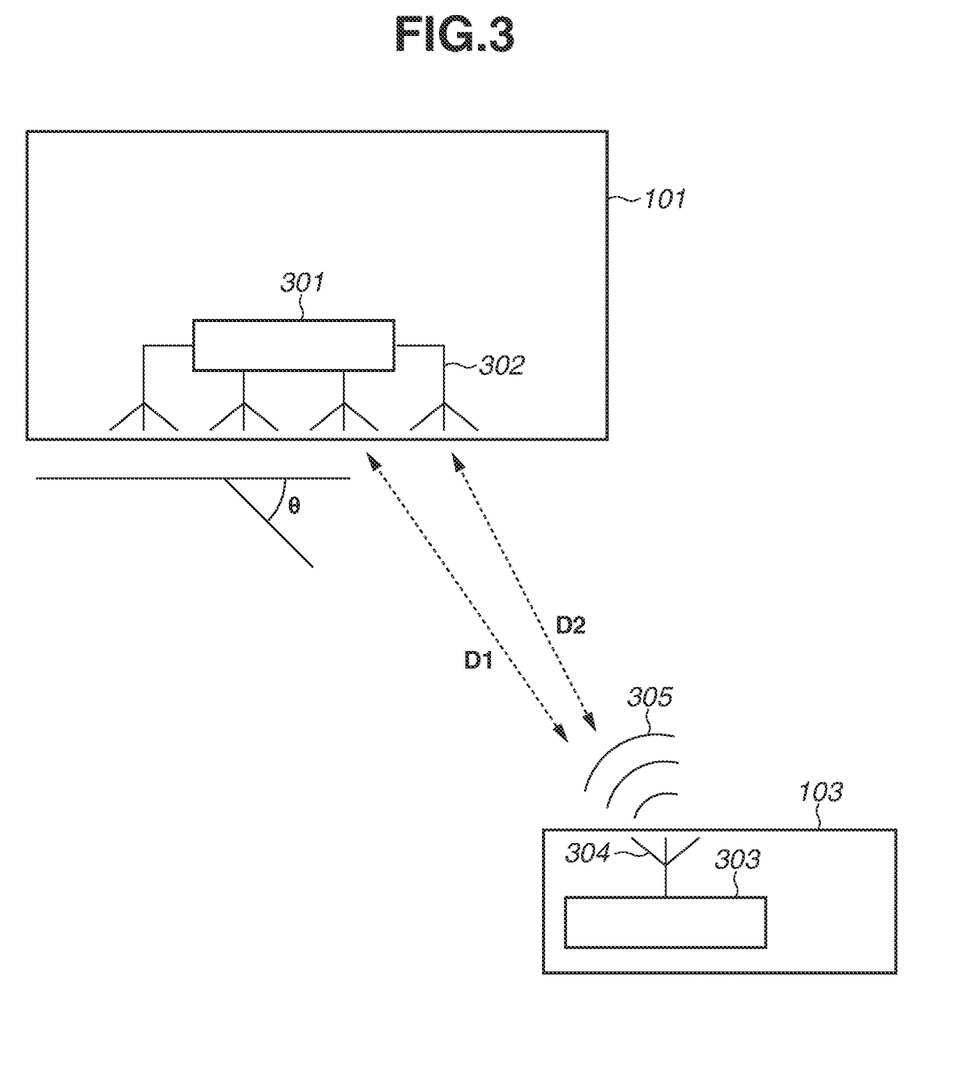
FIG. 3 is a diagram illustrating a principle for detecting an incoming direction of a radio wave received from a wireless apparatus.

FIG. 3 illustrates a principle based on which the network camera 101 detects the radio wave direction of the wireless apparatus 103. According to the direction finding function in wireless communication conforming to the Bluetooth® 5.1 specifications, the radio wave direction is detected by using an antenna array including a plurality of antennas and utilizing phase differences among radio waves derived from positional differences among the plurality of antennas. The following two methods are available as the method for detecting the radio wave direction. The first method is called Angle Of Arrival (AoA) in which a reception device side calculates an angle at which the radio wave is received.

The second method is called Angle Of Departure (AoD) in which a transmission device side calculates a radiation angle and transmits the calculated radiation angle to the reception device. AoA is used to detect the direction assuming that the wireless apparatus 103 and the network camera 101 serve as the transmission device and the reception device, respectively, in the present exemplary embodiment, but use of AoD can also provide a similar advantageous effect.

As illustrated in FIG. 3, the network camera 101 serving as the reception device includes a receiver 301 and a plurality of antennas 302 disposed at equal spacings. The wireless apparatus 103 serving as the transmission device includes a transmitter 303 and a single antenna 304. The wireless apparatus 103 causes the transmitter 303 to transmit, from the single antenna 304, a radio wave 305 including a special direction finding signal, and the network camera 101 receives the radio wave 305 using the plurality of antennas 302. At this time, each of the plurality of antennas 302 disposed at equal spacings receives the radio wave 305. As a result, since distances between the single antenna 304 and the plurality of antennas 302 differ like a distance D1 and a distance D2, the network camera 101 can detect a signal having a different phase using each of the plurality of antennas 302. While switching an active antenna, the network camera 101 acquires a modulation signal (an in-phase and quadrature (IQ) modulation signal) having an in-phase component and a quadrature component as phase information of the radio wave 305, and calculates an incident angle θ, which is a relative direction of the signal, based on the acquired IQ modulation signal. The incident angle θ is calculated using the wavelength of the radio wave 305, the antenna-to-antenna distance, and the phase difference. The calculation method is known and thus the description thereof will be omitted. Calibration performed at the time of installation enables the network camera 101 to identify the current orientation of the network camera 101 in a three-dimensional space. Thus, the network camera 101 can identify the relative position of the wireless apparatus 103 as viewed from the network camera 101, based on the radio wave direction of the wireless apparatus 103.

Figure 4:
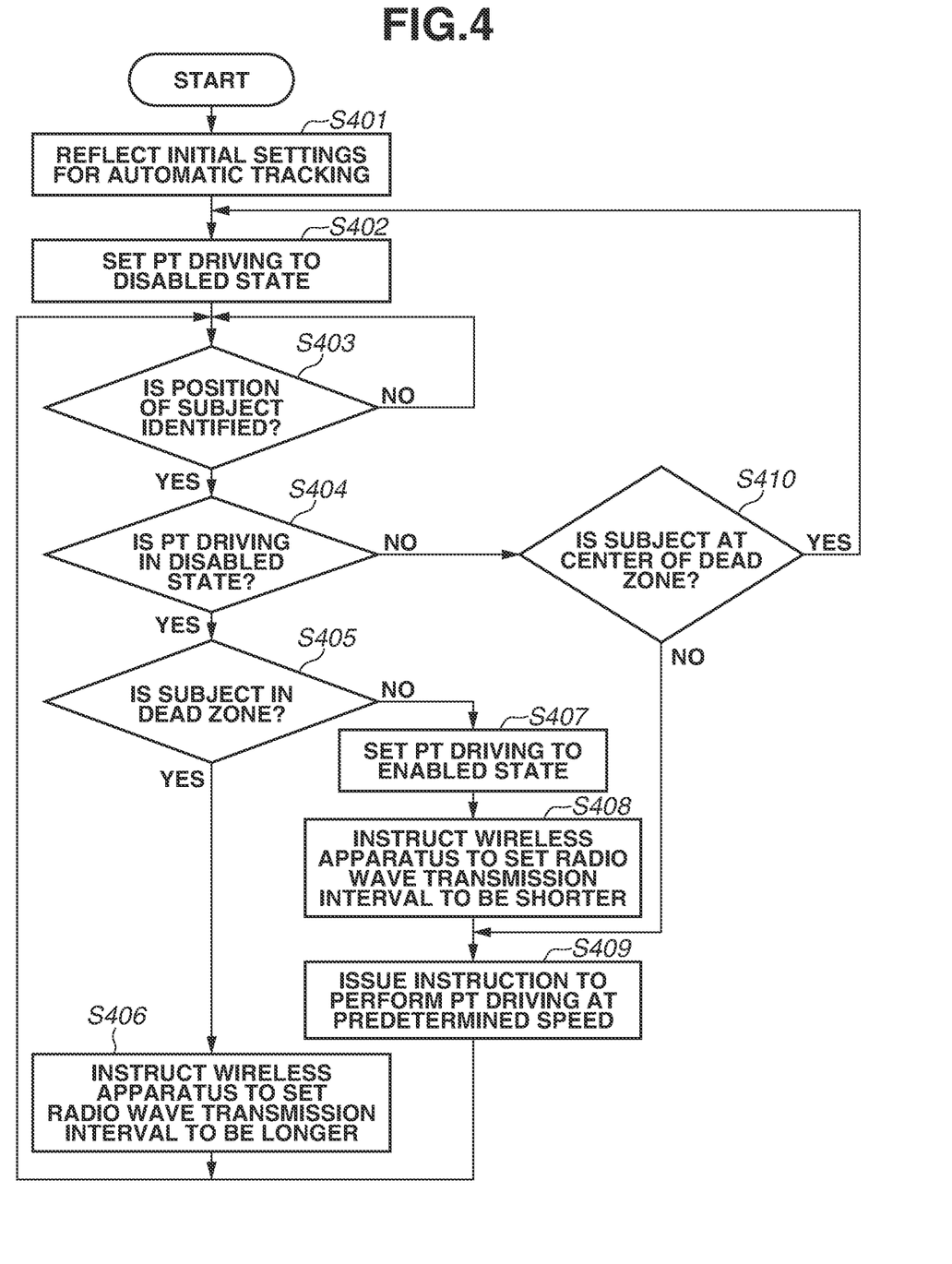
FIG. 4 is a flowchart illustrating automatic tracking processing by the network camera according to the first exemplary embodiment.

Next, the automatic tracking processing by the network camera 101 according to the present exemplary embodiment will be described with reference to a flowchart illustrated in FIG. 4. FIGS. 5A to 5F schematically illustrate examples of the image frame of the captured image in the automatic tracking processing.

In step S401, the tracking system control unit 212-5 reflects the initial settings related to the operation of the automatic tracking processing. The contents of the initial settings include the subject 106 determined to be tracked and information about the size and the placement of the dead zone 501. The contents of the initial settings may be predetermined or may be determined based on an input from the client apparatus 102.

In step S402, the PTZ control unit 212-3 sets the PT driving to the disabled state. As a result, the PT driving for the automatic tracking is not performed until the PT driving is set to the enabled state in step S407 (described below), i.e., until the disabled state is explicitly canceled.

In step S403, the position identification unit 212-1 identifies the position of the subject 106 based on the radio wave direction of the wireless apparatus 103 held by the subject 106. In a case where the position of the subject 106 is identified (YES in step S403), the processing proceeds to step S404. In a case where the position of the subject 106 is not identified (NO in step S403), the processing returns to step S403.

In step S404, the PTZ control unit 212-3 determines whether the PT driving is in the disabled state. In a case where the PT driving is in the disabled state (YES in step S404), the processing proceeds to step S405. In a case where the PT driving is not in the disabled state, i.e., is in the enabled state (NO in step S404), the processing proceeds to step S410.

In step S405, the position determination unit 212-2 determines whether the subject 106 is in the dead zone 501, based on the position of the subject 106 identified in step S403. In a case where the subject 106 is in the dead zone 501 (YES in step S405), the processing proceeds to step S406. In a case where the subject 106 is not in the dead zone 501, i.e., is outside the dead zone 501 (NO in step S405), the processing proceeds to step S407.

In step S406, the interval control unit 212-4 instructs the wireless apparatus 103 to set the transmission interval for transmitting the radio wave from the wireless apparatus 103 to a longer interval than a predetermined interval. This enables reduction of the battery consumption in the wireless apparatus 103.

In step S407, the PTZ control unit 212-3 sets the PT driving to the enabled state. As a result, the PT driving for the automatic tracking is performed until the PT driving is set to the disabled state in step S402 next time.

In step S408, the interval control unit 212-4 instructs the wireless apparatus 103 to set the transmission interval for transmitting the radio wave from the wireless apparatus 103 to a shorter interval than a predetermined interval. This makes it possible to keep track of the position of the subject 106.

In step S409, the PTZ control unit 212-3 issues an instruction to perform the PT driving at a predetermined speed toward the position of the subject 106 identified in step S403. In this example, the imaging direction is changed so as to display the subject 106 at a central position 504 of the dead zone 501. More specifically, driving amounts in the pan direction and the tilt direction are obtained to perform the PT driving, but the method for obtaining the driving amounts is known and the description thereof will be omitted. The predetermined speed is a speed that allows a background object to be visible in the captured image in order to prevent the image from looking as if the background is flowing, and may be adjustable depending on a use case.

In step S410, the position determination unit 212-2 determines whether the subject 106 reaches the central position 504 of the dead zone 501, based on the position of the subject 106 identified in step S403. In a case where the subject 106 does not reach the central position 504 of the dead zone 501 (NO in step S410), the processing proceeds to step S409 to continue the PT driving. In a case where the subject 106 reaches the central position 504 of the dead zone 501 (YES in step S410), the processing returns to step S402. In this manner, when the subject 106 has become displayed at the central position 504 of the dead zone 501 by the change of the imaging direction, the control to change the imaging direction is switched to the control not to change the imaging direction.

In the present exemplary embodiment, the example where the imaging direction is changed to display the subject 106 at the central position 504 of the dead zone 501 has been described, but the present exemplary embodiment is not limited thereto. The imaging direction may be changed to display the subject 106 at a predetermined position of the dead zone 501. The predetermined position is adjustable depending on a use case, and the network camera 101 may be configured to set the predetermined position in the initial settings in step S401.

A specific example of the automatic tracking processing in the flowchart in FIG. 4 will be described with reference to FIGS. 5A to 5F.

FIGS. 5A to 5F illustrate the dead zone 501, a position 502 of the subject 106 (the wireless apparatus 103), an arrow 503 indicating a movement of the subject 106, and the central position 504 of the dead zone 501.

Figure 5A:
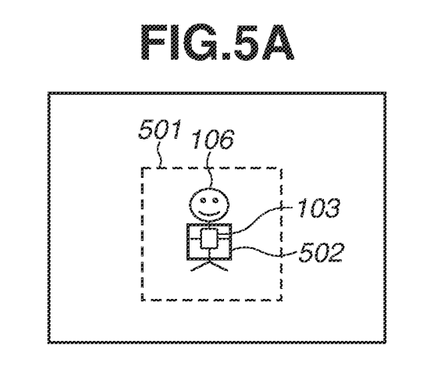
FIGS. 5A to 5F are schematic diagrams each illustrating an example of an image frame of a captured image in the automatic tracking processing according to the first exemplary embodiment.
Figure 5B:
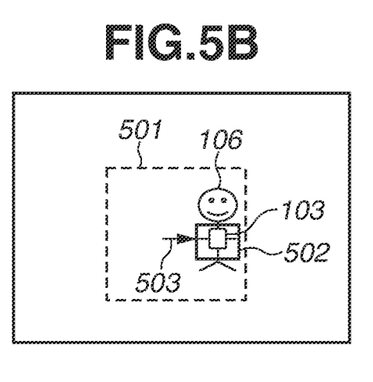

First, processing for controlling the PT driving not to be performed in conjunction with the movement of the subject 106 will be described with reference to FIGS. 5A and 5B. In FIG. 5A, the PT driving is in the disabled state, and the position 502 of the subject 106 identified by the position identification unit 212-1 is in the dead zone 501. Referring to FIG. 4, the position 502 of the subject 106 is identified (YES in step S403), and the PT driving is determined to be in the disabled state (YES in step S404). Then, the subject 106 is determined to be in the dead zone 501 (YES in step S405). Although the illustration is omitted, in step S406, the wireless apparatus 103 is instructed to set the transmission interval for transmitting the radio wave from the wireless apparatus 103 to a longer interval than the predetermined interval, and the processing returns to step S403. The processing from step S403 to step S406 is repeated while the subject 106 is in the dead zone 501 (until the subject 106 is determined to be outside the dead zone 501 (NO in step S405)). For example, in FIG. 5B, the subject 106 has moved from a central portion to a boundary portion of the dead zone 501 but is still in the dead zone 501, and thus the processing proceeds similarly to the example of FIG. 5A.

Figure 5C:
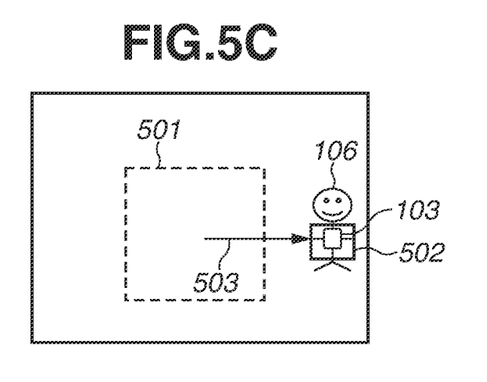
Figure 5D:
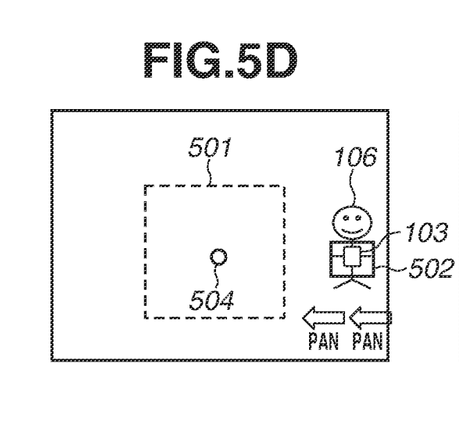
Figure 5E:
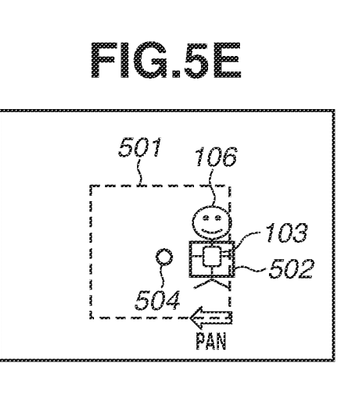
Figure 5F:
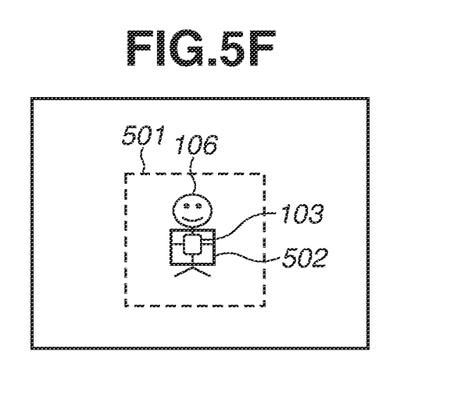

Next, processing for controlling the PT driving to be performed in conjunction with the movement of the subject 106 will be described with reference to FIGS. 5C to 5F. In FIG. 5C, the subject 106 in the state illustrated in FIG. 5B moves out of the dead zone 501, so that the position 502 of the subject 106 identified by the position identification unit 212-1 falls outside the dead zone 501. Referring to FIG. 4, the position 502 of the subject 106 is identified (YES in step S403), and the PT driving is determined to be in the disabled state (YES in step S404). Then, the subject 106 is determined to be outside the dead zone 501 (NO in step S405), and the PT driving is set to the enabled state in step S407. Although the illustration is omitted, in step S408, the wireless apparatus 103 is instructed to set the transmission interval for transmitting the radio wave from the wireless apparatus 103 to a shorter interval than the predetermined interval. In step S409, as illustrated in FIG. 5D, an instruction is issued to perform the PT driving at the predetermined speed so that the subject 106 is displayed at the central position 504 of the dead zone 501, and the processing returns to step S403. The processing of steps S403, S404, S410, and S409 is repeated until, as illustrated in FIG. 5F, the subject 106 is displayed at the central position 504 of the dead zone 501 after being displayed in the state of FIG. 5D and the state of FIG. 5E. The PT driving is kept in the enabled state until the subject 106 is displayed at the central position 504 of the dead zone 501. Thus, as illustrated in FIG. 5E, the PT driving is continued even if the subject 106 is captured in the dead zone 501. This is because, if the PT driving is disabled immediately after the subject 106 enters the dead zone 501, a slight movement of the subject 106 causes the subject 106 to move out of the dead zone 501. FIG. 5F illustrates a state where the subject 106 is determined to be displayed at the central position 504 of the dead zone 501 (YES in step S410) after being displayed in the state of FIG. 5D and the state of the 5E.

As a result, in step S402, the PT driving is set to the disabled state, and the processing returns to the state illustrated in FIG. 5A.

As described above, the position of the subject 106 is identified based on the radio wave direction of the wireless apparatus 103 held by the subject 106. Thus, unlike the case of using the video analysis, the position of the subject 106 can be accurately identified without being affected by the imaging environment, such as a color change due to an illumination change, and the state of the object appearing in the video image, such as the orientation and posture of the person.

In addition, the PT driving is set to the disabled state to prevent the change of the imaging direction on condition that the subject 106 is in the dead zone 501. Thus, the PT driving is not performed in conjunction with every slight movement of the subject 106, so that a screen shake and a phenomenon where a viewer suffers from screen sickness can be suppressed. On the other hand, the PT driving is set to the enabled state to change the imaging direction to track the subject 106 on condition that the subject 106 is not in the dead zone 501. At this time, the imaging direction is changed at the speed that allows the background object to be visible, so that the image can be prevented from looking as if the background is flowing. As a result, a video image can be provided with improved visibility.

Furthermore, while the subject 106 is in the dead zone 501, the transmission interval for transmitting the radio wave from the wireless apparatus 103 is set to be longer than the transmission interval set while the subject 106 is not in the dead zone 501.

Thus, the battery consumption can be reduced while the subject 106 is in the dead zone 501. On the other hand, the position 502 of the subject 106 is kept track of while the subject 106 is outside the dead zone 501. As described above, the imaging direction can be changed as appropriate to quickly capture the subject 106 while power saving of the wireless apparatus 103 is achieved.

In the present exemplary embodiment, the PT driving by the PTZ control unit 212-3 has been mainly described. Alternatively, for example, the distance to the wireless apparatus 103 (the distance to the subject 106) may be estimated based on the intensity of the radio wave from the wireless apparatus 103 to perform zoom control as appropriate. In this case, it is desirable to enlarge or reduce the dead zone 501 based on the zoom ratio to maintain the relationship in size between the subject 106 and the dead zone 501. This is intended to prevent the subject 106 from moving out of the dead zone 501 when the network camera 101 zooms in.

In the present exemplary embodiment, the example has been described assuming that the PT driving is performed at the predetermined speed, but the predetermined speed may not necessarily be constant. For example, in a case where the movement of the subject 106 in the direction toward the dead zone 501 is detected, the speed of the PT driving may be set to be lower than that in a case where the subject 106 does not move. Examples of the method for detecting the movement of the subject 106 include detecting the movement of the subject 106 by using a motion vector of the subject 106 after temporarily stopping the PT driving at a predetermined timing. In this case, in step S408, it is desirable to set the transmission interval to be relatively longer than the current transmission interval.

In the present exemplary embodiment, the example has been described in which the interval control unit 212-4 instructs the wireless apparatus 103 to change the transmission interval for transmitting the radio wave in step S406 or step S408, but the interval control unit 212-4 may not necessarily issue the instruction each time. For example, in step S406, the processing may be skipped if the transmission interval for transmitting the radio wave from the wireless apparatus 103 is longer than the predetermined interval. Similarly, in step S408, the processing may be skipped if the transmission interval for transmitting the radio wave from the wireless apparatus 103 is shorter than the predetermined interval.

In the actual use scene, the subject 106 may return to the dead zone 501 immediately after moving from the inside to the outside of the dead zone 501. Examples thereof include a situation where the person as the subject 106 opens or closes a window or a door, and immediately returns to the original position.

Considering such a situation, in a second exemplary embodiment of the present disclosure, a configuration will be described in which the PT driving is kept in the disabled state, for example, in a case where the subject 106 temporarily moves out of the dead zone 501. A configuration and a basic processing operation of the network camera 101 are similar to those in the first exemplary embodiment, and components and processing operations similar to those in the first exemplary embodiment are designated by the same reference numerals and the descriptions thereof will be omitted. A difference from the first exemplary embodiment will be mainly described.

Figure 6:
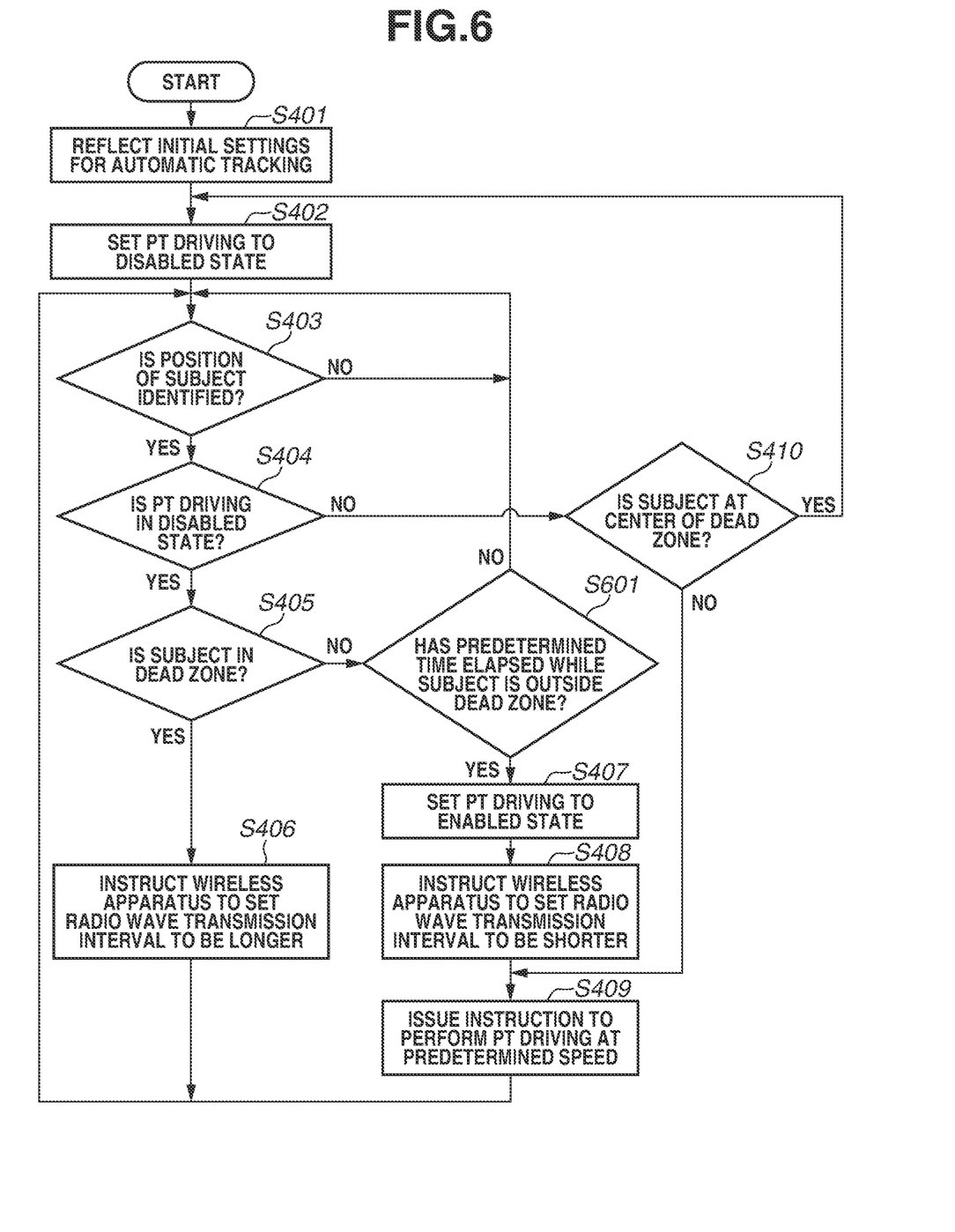
FIG. 6 is a flowchart illustrating automatic tracking processing by a network camera according to a second exemplary embodiment.

Automatic tracking processing by the network camera 101 according to the present exemplary embodiment will be described with reference to a flowchart illustrated in FIG. 6. Processing similar to the processing in the flowchart illustrated in FIG. 4 is designated by the same reference numerals, and the description thereof will be omitted. FIGS. 7A to 7D schematically illustrate examples of the image frame of the captured image in the automatic tracking processing.

In a case where the subject 106 is determined to be outside the dead zone 501 (NO in step S405), the processing proceeds to step S601. In step S601, the position determination unit 212-2 determines whether a predetermined time has elapsed while the subject 106 is outside the dead zone 501. In a case where the predetermined time has elapsed (YES in step S601), the processing proceeds to step S407 to set the PT driving to the enabled state.

In a case where the predetermined time has not elapsed (NO in step S601), the processing returns to step S403. The predetermined time is set, for example, in the initial settings in step S401. A time during which the subject 106 stays outside the dead zone 501 is to be measured after the subject 106 is determined to be outside the dead zone 501, using, for example, a timer function inside the network camera 101.

A specific example of the automatic tracking processing according to the flowchart in FIG. 6 will be described with reference to FIGS. 7A to 7D.

FIGS. 7A to 7D schematically illustrate examples of the image frame of the captured image in the automatic tracking processing, similarly to FIGS. 5A to 5F.

Figure 7A:
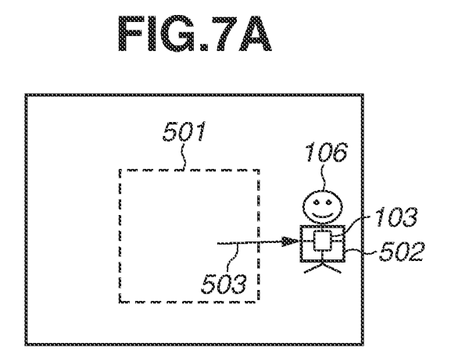
FIGS. 7A to 7D are schematic diagrams each illustrating an example of an image frame of a captured image in the automatic tracking processing according to the second exemplary embodiment.
Figure 7B:
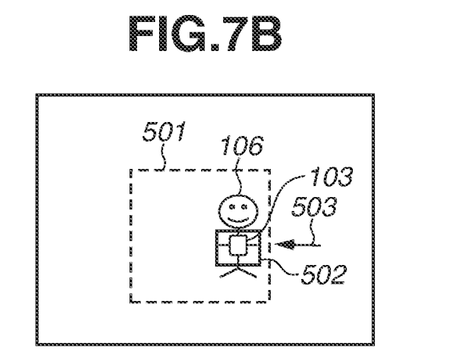

First, processing for keeping the PT driving in the disabled state in a case where the subject 106 temporarily moves out of the dead zone 501 will be described with reference to FIGS. 7A and 7B. FIG. 7A illustrates a state where the PT driving is in the disabled state, and the position 502 of the subject 106 identified by the position identification unit 212-1 is determined to move from the inside to the outside of the dead zone 501. The time during which the subject 106 stays outside the dead zone 501 is measured from this moment. If the predetermined time has not elapsed (NO in step S601), the processing returns to step S403. FIG. 7B illustrates a state where the position 502 of the subject 106 identified by the position identification unit 212-1 returns to the dead zone 501 again, i.e., is determined to be in the dead zone 501 (YES in step S405) before the predetermined time elapses. In this manner, the PT driving is kept in the disabled state if the subject 106 returns to the dead zone 501 before the predetermined time elapses.

Figure 7C:
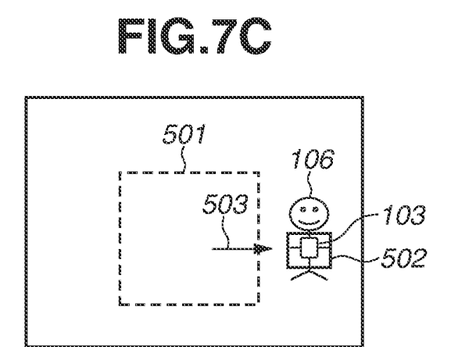
Figure 7D:
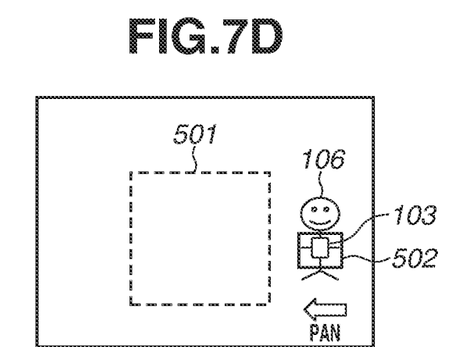

Next, processing for setting the PT driving to the enabled state in a case where the predetermined time has elapsed after the movement of the subject 106 to the outside of the dead zone 501 will be described with reference to FIGS. 7C and 7D. FIG. 7C illustrates a state where the PT driving is in the disabled state, and the position 502 of the subject 106 identified by the position identification unit 212-1 is determined to move from the inside to the outside of the dead zone 501. The time during which the subject 106 stays outside the dead zone 501 is measured from this moment. In case where the predetermined time has elapsed (YES in step S601), the PT driving is set to the enabled state in step S407. Although the illustration is omitted, in step S408, the wireless apparatus 103 is instructed to set the transmission interval for transmitting the radio wave from the wireless apparatus 103 to a shorter interval than the predetermined interval. In step S409, as illustrated in FIG. 7D, an instruction is issued to perform the PT driving at the predetermined speed so that the subject 106 is displayed at the central position 504 of the dead zone 501, and the processing returns to step S403.

As described above, in a case where the subject 106 is determined to be outside the dead zone 501, the PT driving is disabled until the time during which the subject 106 stays outside the dead zone 501 exceeds the predetermined time, and the PT driving is enabled to change the imaging direction after the predetermined time elapses. This makes it possible to reduce a processing load by reducing unnecessary PT driving when the subject 106 temporarily moves out of the dead zone 501, and also to suppress a screen shake due to the PT driving. As a result, a video image can be provided with improved visibility. Furthermore, the state where the transmission interval for transmitting the radio wave from the wireless apparatus 103 is set to be long can be maintained, so that the battery consumption in the wireless apparatus 103 can be reduced.

In the first exemplary embodiment, the battery consumption in the wireless apparatus 103 is reduced by setting the transmission interval for transmitting the radio wave from the wireless apparatus 103 to a longer interval than the predetermined interval in a case where the subject 106 is in the dead zone 501. On the other hand, an increase in the transmission interval can cause a delay in the timing of identifying the position of the subject 106, thereby resulting in a delay in, for example, detecting the movement of the subject 106 to the outside of the dead zone 501.

To address this, in a third exemplary embodiment of the present disclosure, a configuration will be described in which, while the subject 106 is in the dead zone 501, the transmission interval for transmitting the radio wave from the wireless apparatus 103 is changed based on the position of the subject 106. More specifically, the transmission interval is set to be shorter when the subject 106 is in a region near a boundary of the dead zone 501 than when the subject 106 is not in the region. In the present exemplary embodiment, components and processing operations similar to those in the first exemplary embodiment are designated by the same reference numerals and the descriptions thereof will be omitted. A difference from the first exemplary embodiment will be mainly described.

Figure 8:
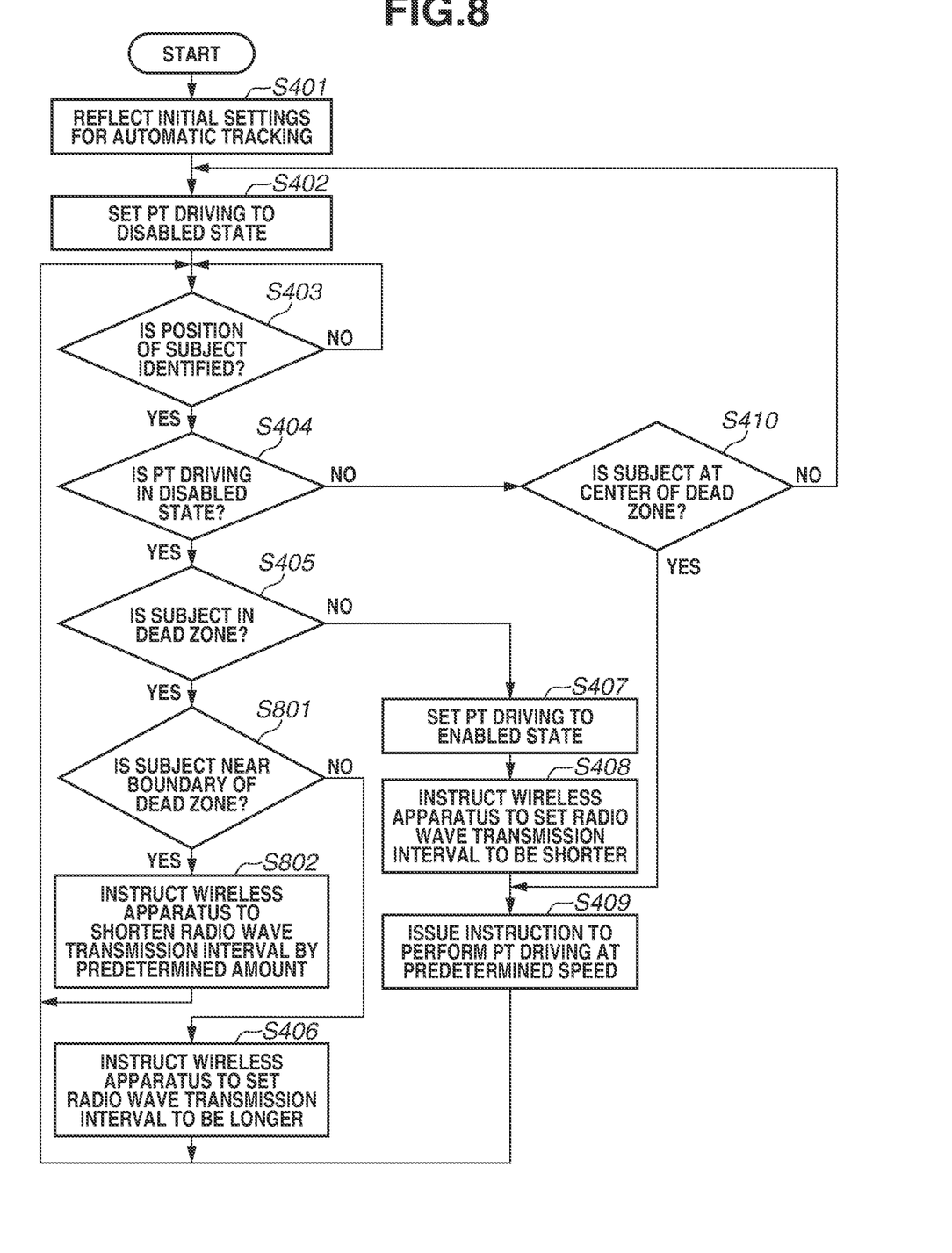
FIG. 8 is a flowchart illustrating automatic tracking processing by a network camera according to a third exemplary embodiment.
Figure 9A:
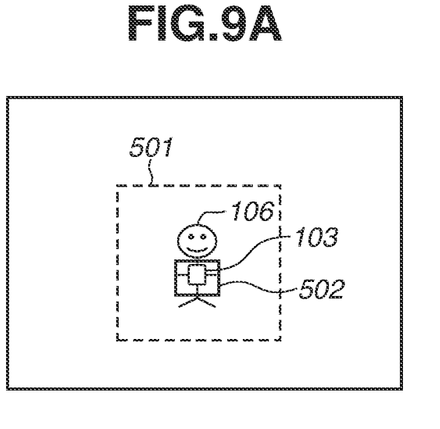
FIGS. 9A and 9B are schematic diagrams each illustrating an example of an image frame of a captured image in the automatic tracking processing according to the third exemplary embodiment.
Figure 9B:
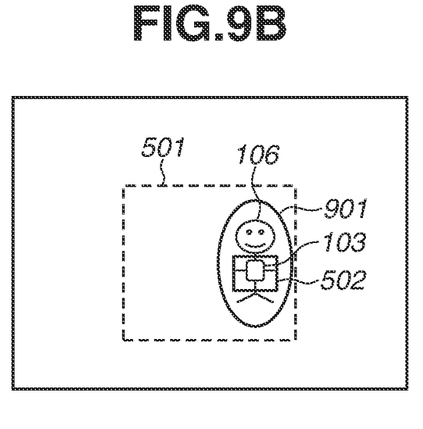

Automatic tracking processing by the network camera 101 according to the present exemplary embodiment will be described with reference to a flowchart illustrated in FIG. 8. Processing similar to the processing in the flowchart illustrated in FIG. 4 is designated by the same reference numerals, and the description thereof will be omitted. FIGS. 9A and 9B schematically illustrate examples of the image frame of the captured image in the automatic tracking processing.

In a case where the subject 106 is determined to be in the dead zone 501 (YES in step S405), the processing proceeds to step S801. In step S801, the position determination unit 212-2 determines whether the subject 106 is in a region 901 near the boundary. In a case where the subject 106 is in the region 901 near the boundary (YES in step S801), the processing proceeds to step S802. In a case where the subject 106 is not in the region 901 near the boundary (NO in step S801), the processing proceeds to step S406. There can be two types of method for determining whether the subject 106 is in the region 901 near the boundary. One is a method that identifies the position of the subject 106 based on the radio wave direction of the wireless apparatus 103. In this case, the determination can be made using the existing mechanism. However, because the network camera 101 is in the state where the transmission interval for transmitting the radio wave from the wireless apparatus 103 is set to be long, a situation can occur in which the timing of identifying the position of the subject 106 is delayed and the subject 106 moves out of the dead zone 501 before the subject 106 is determined to be in the region 901 near the boundary. The other is a method that utilizes the video analysis unit 208. Supplementarily using the moving object detection or the human body detection by the video analysis unit 208 can prevent a delay in the timing of identifying the position of the subject 106 and determine whether the subject 106 is in the region 901 near the boundary.

In step S802, the interval control unit 212-4 instructs the wireless apparatus 103 to shorten the transmission interval for transmitting the radio wave from the wireless apparatus 103 by a predetermined amount. The processing then returns to step S403. The predetermined amount is set to a value that allows the transmission interval to be longer than the transmission interval set in step S408 and to be shorter than the transmission interval set in step S406.

A specific example of the automatic tracking processing in the flowchart in FIG. 8 will be described with reference to FIGS. 9A and 9B.

FIGS. 9A and 9B schematically illustrate examples of the image frame of the captured image in the automatic tracking processing, similarly to FIGS. 5A to 5F.

FIG. 9A illustrates a state that the subject 106 is at the central position 504 of the dead zone 501. In this case, the subject 106 is determined to be in the dead zone 501 (YES in step S405) and is determined not to be in the region 901 near the boundary (NO in step S801). Thus, in step S406, the wireless apparatus 103 is instructed to set the transmission interval for transmitting the radio wave from the wireless apparatus 103 to a longer interval than the predetermined interval, and the processing returns to step S403.

FIG. 9B illustrates a state that the subject 106 in the state illustrated in FIG. 9A moves to the region 901 near the boundary of the dead zone 501. In this example, the position determination unit 212-2 determines whether the subject 106 is in the region 901 near the boundary, by supplementarily using the moving object detection or the human body detection by the video analysis unit 208. In this case, the subject 106 is determined to be in the dead zone 501 (YES in step S405) and is determined to be in the region 901 near the boundary (YES in step S801). Thus, in step S802, the wireless apparatus 103 is instructed to shorten the transmission interval for transmitting the radio wave from the wireless apparatus 103 by the predetermined amount, and the processing returns to step S403.

As described above, the transmission interval for transmitting the radio wave from the wireless apparatus 103 is shortened by the predetermined amount in a case where the subject 106 is in the region 901 near the boundary even while the subject 106 is in the dead zone 501. This makes it possible to prevent a delay in the timing of identifying the position of the subject 106, thereby preventing a delay in, for example, detecting the movement of the subject 106 to the outside of the dead zone 501. Thus, the distance in which the PT driving is performed is reduced, so that a screen shake due to the PT driving can be suppressed. As a result, a video image can be provided with improved visibility.

The above-described exemplary embodiments merely illustrate concrete examples for implementing the present disclosure, and the technical scope of the present disclosure shall not be interpreted in a limited manner by the exemplary embodiments. In other words, the exemplary embodiments of the present disclosure can be implemented in various manners without departing from the technical idea or the main features of the present disclosure.

The wireless communication conforming to the Bluetooth® version 5.1 specifications has been described in the above-described exemplary embodiments, but the version is not limited thereto as long as the direction finding function is operable. In other words, Bluetooth® version 5.2 or later versions satisfy the condition for the wireless communication standard to which any of the exemplary embodiments of the present disclosure is applied.

The exemplary embodiments of the present disclosure can also be implemented by supplying a program for implementing one or more functions according to the above-described exemplary embodiments to a system or an apparatus via a network or a storage medium, and causing one or more processors in a computer of the system or the apparatus to read out and execute the program. Furthermore, the exemplary embodiments of the present disclosure can also be implemented by a circuit (e.g., an application specific integrated circuit (ASIC)) for implementing one or more functions according to the exemplary embodiments.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-081560, filed May 13, 2021, which is hereby incorporated by reference herein in its entirety.

What is claimed is:

1. An imaging apparatus configured to change an imaging direction and to perform wireless communication, the imaging apparatus comprising:
   at least one memory storing instructions; and
   at least one processor that is configured, upon execution of the stored instructions, to act as:
   a position identification unit configured to identify a position of a subject based on a direction of a radio wave received from a wireless apparatus held by the subject, and
   a control unit configured to perform control to change the imaging direction based on the identified position of the subject not being in a predetermined region of a captured image and not to change the imaging direction based on the subject being in the predetermined region,
   wherein the control unit changes the imaging direction so that the subject is captured in the predetermined region of the captured image.

2. The imaging apparatus according to claim 1, wherein the control unit changes the imaging direction in a case where a predetermined time has passed since the subject has moved from the predetermined region to a region other than the predetermined region.

3. The imaging apparatus according to claim 1, wherein the control unit sets a disabled state for disabling the change of the imaging direction, and cancels the set disabled state based on the subject not being in the predetermined region.

4. The imaging apparatus according to claim 1, wherein the at least one processor is configured to further act as an interval control unit configured to control a transmission interval for transmitting the radio wave from the wireless apparatus.

5. The imaging apparatus according to claim 4, wherein the interval control unit sets the transmission interval to be longer in a case where the subject is in the predetermined region than in a case where the subject is not in the predetermined region.

6. The imaging apparatus according to claim 4, wherein the interval control unit changes the transmission interval based on the position of the subject in the predetermined region while the subject is in the predetermined region.

7. The imaging apparatus according to claim 6, wherein the interval control unit sets the transmission interval to be shorter in a case where the subject is in a region near a boundary of the predetermined region than in a case where the subject is not in the region.

8. The imaging apparatus according to claim 7, wherein whether the subject is in the region near the boundary of the predetermined region is determined using a video analysis.

9. The imaging apparatus according to claim 1, wherein the predetermined region is a central region of the captured image.

10. The imaging apparatus according to claim 1, wherein the position identification unit identifies the position of the subject based on a direction finding function of Bluetooth®.

11. A method for controlling an imaging apparatus configured to change an imaging direction and to perform wireless communication, the method comprising:
   identifying a position of a subject based on a direction of a radio wave received from a wireless apparatus held by the subject; and
   performing control to change the image direction based on the identified position of the subject not being in a predetermined region of a captured image, and not to change the imaging direction based on the subject being in the predetermined region,
   wherein the control unit changes the imaging direction so that the subject is captured in the predetermined region of the captured image.

12. A non-transitory computer-readable storage medium storing instructions that, when executed by one or more processors, control an imaging apparatus that is configured to change an imaging direction and to perform wireless communication, to perform a control method, the control method comprising:
- identifying a position of a subject based on a direction of a radio wave received from a wireless apparatus held by the subject; and
- performing control to change the imaging direction based on the identified position of the subject not being in a predetermined region of a captured image, and not to change the imaging direction based on the subject being in the predetermined region,
- wherein the control unit changes the imaging direction so that the subject is captured in the predetermined region of the captured image.

* * * * *